(12) United States Patent
Namuduri et al.

(10) Patent No.: US 9,914,599 B2
(45) Date of Patent: Mar. 13, 2018

(54) SYSTEMS, PROCESSES AND APPARATUSES FOR AUTOMATED HANDLING OF NON-FERROUS METAL OBJECTS

(71) Applicant: GM GLOBAL TECHNOLOGY OPERATIONS LLC, Detroit, MI (US)

(72) Inventors: Chandra S. Namuduri, Troy, MI (US); Thomas W. Nehl, Shelby Township, MI (US); James J. Abramczyk, Clarkston, MI (US); Kenneth J. Shoemaker, Highland, MI (US); Michael J. Karagoulis, Okemos, MI (US); James S. Dorenbecker, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/364,424

(22) Filed: Nov. 30, 2016

(65) Prior Publication Data

US 2017/0158441 A1 Jun. 8, 2017

Related U.S. Application Data

(60) Provisional application No. 62/363,539, filed on Jul. 18, 2016, provisional application No. 62/263,097,
(Continued)

(51) Int. Cl.
| | |
|---|---|
| *B25J 15/06* | (2006.01) |
| *B65H 3/16* | (2006.01) |
| *B66C 1/04* | (2006.01) |
| *B65G 59/04* | (2006.01) |
| *B25J 9/16* | (2006.01) |

(Continued)

(52) U.S. Cl.
CPC ............ *B65G 59/04* (2013.01); *B25J 9/1687* (2013.01); *B65G 54/02* (2013.01); *H02K 15/02* (2013.01); *H02K 41/025* (2013.01)

(58) Field of Classification Search
CPC ... Y10S 271/901; B65G 59/04; B65G 59/045; B65G 54/02; B21D 43/24; H01F 7/0247
USPC ................. 271/145, 18.1, 901; 29/744, 810; 335/288, 302
See application file for complete search history.

(56) References Cited

U.S. PATENT DOCUMENTS

| | | | | |
|---|---|---|---|---|
| 2,474,141 A | * | 6/1949 | Chatterton ............. | B21D 43/24 |
| | | | | 271/18.1 |
| 2,973,959 A | * | 3/1961 | Stolk .................... | B65G 59/045 |
| | | | | 271/18.1 |

(Continued)

*Primary Examiner* — Gregory W Adams
(74) *Attorney, Agent, or Firm* — Quinn IP Law

(57) ABSTRACT

Disclosed are electromagnetic apparatuses for separating non-ferrous blanks, methods for making and for using such apparatuses, and automated systems with electromagnetic destacking unit for handling stacks of non-ferrous blanks. Presented is a destacking unit with a magnet placed adjacent a stack of non-ferrous blanks, and two electrical terminals placed in contact with the top blank of the stack. The magnet generates a magnetic field across the surface of the top blank. The terminals pass electrical current through the blank transversely across the top surface. The direction of the electrical current is generally normal to the direction of the magnetic field such that a magnetic separation force sufficient to displace the blank from the stack is generated in a generally vertical direction.

20 Claims, 5 Drawing Sheets

Related U.S. Application Data filed on Dec. 4, 2015, provisional application No. 62/263,094, filed on Dec. 4, 2015.

(51) Int. Cl.
*H02K 15/02* (2006.01)
*H02K 41/025* (2006.01)
*B65G 54/02* (2006.01)

(56) References Cited

U.S. PATENT DOCUMENTS

| | | | | |
|---|---|---|---|---|
| 3,353,822 A * | 11/1967 | Dangelmaier | ......... | B21D 43/24 271/18.1 |
| 3,395,912 A * | 8/1968 | Tappolet | ................ | B21D 43/24 257/E21.544 |
| 4,387,508 A * | 6/1983 | Wyatt | ................... | H01F 41/02 271/193 |
| 4,815,916 A * | 3/1989 | Beck | ...................... | B65G 59/04 271/154 |
| 4,946,341 A * | 8/1990 | Parsley | ................ | B65G 59/045 271/155 |
| 5,018,939 A * | 5/1991 | Kishi | ..................... | B21D 43/20 271/18.1 |
| 5,631,618 A * | 5/1997 | Trumper | ............. | G03F 7/70758 104/286 |
| 5,651,541 A * | 7/1997 | Prime | ...................... | B65H 3/60 271/18.1 |
| 5,669,156 A * | 9/1997 | Vejchoda | ................ | F26B 15/18 198/381 |
| 6,146,086 A * | 11/2000 | Snell | ...................... | B65G 54/02 198/465.1 |
| 6,481,706 B1 * | 11/2002 | Gaeddert | ............... | B65G 59/04 271/105 |
| 6,746,063 B1 * | 6/2004 | Sanchez | ................. | B21D 43/24 271/18.1 |
| 2010/0101879 A1 * | 4/2010 | McVickers | ......... | B60L 11/1822 180/65.51 |

* cited by examiner

SYSTEMS, PROCESSES AND APPARATUSES FOR AUTOMATED HANDLING OF NON-FERROUS METAL OBJECTS

CLAIM OF PRIORITY AND CROSS-REFERENCE TO RELATED APPLICATIONS

This application claims the right of priority to U.S. Provisional Patent Application No. 62/363,539, filed on Jul. 18, 2016, U.S. Provisional Patent Application No. 62/263,097, filed on Dec. 4, 2015, and U.S. Provisional Patent Application No. 62/263,094, filed on Dec. 4, 2015, all of which are incorporated herein by reference in their respective entireties and for all purposes.

INTRODUCTION

The present disclosure relates generally to automated systems for handling non-ferrous objects. More specifically, aspects of this disclosure relate to automated electrodynamic apparatuses, systems and related processes for separating non-ferrous sheet metal blanks during handling and processing of the blanks.

Many stamping presses of the type found in industrial manufacturing processes—such as those for fabricating automobile parts—die form discrete, flat sheets of metal known as "blanks." For some of these processes, a pallet of stacked blanks is seated next to the stamping press, and a material handling robot automatically feeds the blanks, one at a time, into the press. Mating tool and die surfaces of the stamping press are brought together by a pneumatically driven or motor driven ram to form the received blank into a desired shape in one or more stamping stages. To facilitate the stamping operation, each loaded individual blank is separated from the remainder of the stack prior to handling. An end-effector of the robot is moved into position above the stack, the uppermost blank is then lifted off the stack by the end-effector, e.g., using applied suction or grippers, and thereafter fed into the stamping press.

For blanks constructed of steel or other ferrous materials, adjacent blanks are sometimes magnetized with opposing polarities to effectuate separation of the top blank from the remainder of the stack. In particular, magnetized adjacent blanks will repel each other, thereby enabling the end-effector to cleanly lift the uppermost blank without inadvertently lifting the blank beneath it. Since this approach relies on the magnetic properties of the metal blanks, it generally may not work with blanks constructed of a non-ferrous material, such as aluminum, zinc, copper and magnesium. Processes for separating non-ferrous blanks may involve delivering compressed air between adjacent blanks using pneumatic air nozzles or air knives. However, depending on the level of drying and filtration of the air, the use of compressed air may result in the unwanted delivery of dirt, compressor oil, and water onto exposed surfaces of the blanks. Compressed air may be relatively expensive to generate and consistently maintain in a plant environment. For some applications, dimple patterns may be added to edges of the blanks to aid in air-based blank separation, with the addition of such dimples being an additional manufacturing step (and cost) that may lead to bowing along the edges which decreases the number of blanks that may be accommodated in a given stack height.

SUMMARY

Disclosed herein are electromagnetic apparatuses for separating non-ferrous metal objects, methods for making and methods for using such apparatuses, and automated robotic manufacturing systems with electromagnetic separators for handling stacks of non-ferrous metal blanks. The electromagnetic apparatus and related system for separating non-ferrous conductive blanks may be employed during a stamping operation, another machining operation, or during any relevant operation in which it is desirable to separate a single non-ferrous metal blank from a stack of such blanks. By way of non-limiting example, disclosed is a novel manufacturing process, including the apparatus, the overall manufacturing system, and methods for controlling the apparatus and/or system, to maximize manufacturing throughput for non-ferrous objects with electrically conductive surfaces.

In accord with a representative example, a sheet metal handling or stamping plant includes a destacking station with electromagnetic means for separating a blank from a stack of blanks such that the separated blank may then be fed into the next processing stage. For instance, the destacking station utilizes a single or a plurality of permanent magnets or electromagnets of predetermined polarity(ies) placed in predetermined positions with respect to the stack of non-ferrous metal blanks. Electrically conductive terminals are selectively placed in electrical contact with a conductive surface of the sheet being separated at predetermined locations with respect to the magnet or magnets. Electronic control means conductively or inductively inject current in a predetermined direction(s) into the blank with the electrical terminals and a sufficient power source. Injecting an electrical current in an uppermost blank of the stack in the presence of a properly oriented magnetic field generates a lifting force on the stack's uppermost blank. The generated force has a magnitude sufficient to separate the uppermost blank from the remainder of the stack. The required orientation of the current, magnetic field and force vectors to produce the desired blank lift is given by Lorentz's Law. The present approach may help to reduce or completely eliminate reliance on compressed air to separate the blanks Also disclosed is a destacking or "fanning" unit with a single magnet placed adjacent one side of a stack of non-ferrous metal blanks, and two weld contacts placed in contact with the top blank of the stack. The unit may be powered by a weld controller or other suitable electronic controller. A travel mechanism is operable to lower or otherwise track down the magnet and weld contacts with the height of the stack as individual blanks are destacked. An optional isolation mechanism is operable to keep the top blank separated from the stack once it has been fanned. Pivot means may be provided to move the weld contacts away from the stack to aid in the removal of the top blank by a material handling robot. Overall weight and footprint of the destacking unit should be minimized.

Some configurations consist of a single magnet, e.g., that is approximately 14.5 inches in length and safety rated so that magnetism may be regulated for personnel access. For some embodiments, the unit consists of two weld contacts for passing current to the blanks. These contacts may be capable of providing sufficient pressure to the stack of blanks to maintain contact during the fanning process, while also being capable of accommodating the blanks as they are fanned upward. Fluid hosing may be incorporated into the unit to provide cooling liquid (e.g., water, oil, etc.) to the contacts and pressurized air to the destacking apparatus retractor mechanism. The electronic control unit may supply DC current or, for some applications, AC current to the electrodes and to electromagnets in embodiments without permanent magnets. For some designs, this control unit may be maneuvered by personnel and, if desired, secured to a moveable pallet cart during setup of a new pallet. The destacking unit may be provided with attachment points for a swing arm. The mechanisms for tracking the magnet and for pivoting the contacts may be manual or automated.

Aspects of the present disclosure are directed to electrodynamic and magnetodynamic fanning units for assisting with the handling of non-ferrous objects. As used herein, "non-ferrous object" and related forms thereof are inclusive of, but not exclusive to, metallic blanks, contoured panels, and flat sheets of an electrically-conductive, non-magnetic material (including alloys) that do not contain iron (ferrite) in appreciable amounts, such as aluminum, zinc, magnesium, metal-laminated plastic, and/or composite materials having a conductive non-ferrous layer. Disclosed, for example, is an electromagnetic destacking apparatus ("destacking" and "fanning" used interchangeably herein) for separating an electrically conductive non-ferrous blank from a stack of the blanks. This destacking apparatus includes one or more magnets that position adjacent the stack, e.g., next to one of the lateral sides of the stack of the blanks. The magnet/magnets generate a static magnetic field in a first (transverse) direction with respect to a conductive surface of the non-ferrous blank positioned on top of the stack. A pair of electrically conductive terminals, such as first and second weld contacts, is configured to contact the conductive surface of the non-ferrous blank and pass an electrical current through the non-ferrous blank in a second (transverse) direction. The direction of the electrical current is generally normal to the direction of the magnetic field such that a (Lorentz) magnetic separation force that is sufficiently large to displace the non-ferrous blank from the stack of blanks is generated in a third (vertical) direction.

In at least some configurations, the magnet comprises multiple magnets of similar or distinct types. The magnet may include an electromagnet and/or a permanent magnet. The destacking apparatus may include or be communicatively coupled to an electronic control unit (ECU) that is operatively coupled to the electrically conductive terminals and configured to regulate the transmission of electrical current through the non-ferrous blank. This ECU may include a programmable high-current AC-to-DC power supply controller or an AC-DC power supply controller with an ultra-capacitor and a series high current switch. Optionally, the destacking apparatus incorporates an automated travel mechanism that selectively repositions the electrically conductive terminals relative to the stack of blanks. In addition, an isolation mechanism may be utilized to retain the separated top-most non-ferrous blank in a raised position at least partially displaced from the stack of blanks.

For some configurations, the destacking apparatus is assembled with a stand or fixture for securely positioning the magnet adjacent the stack of blanks and securely placing the electrically conductive terminals in contact with the top non-ferrous blank. The destacking apparatus stand may include a back-iron base for supporting thereon the magnet. As another option, the apparatus stand is provided with a transverse support rail; each electrically conductive terminal is slidably mounted, e.g., via a slidable mounting bracket, to a respective portion of the transverse support rail. Optionally, a respective biasing mechanism (e.g., a helical spring or a solenoid) is provided to bias each electrically conductive terminal into contact with the conductive surface of the non-ferrous blank. The stand may also be configured with a pair of pivotable armatures, with each electrically conductive terminal being mounted on one of the pivotable armatures. Driving devices may selectively pivot these pivotable armatures, and an ECU may be programmed to control the driving devices and thereby synchronize pivoting of the electrically conductive terminals into and out of contact with the blank.

In at least some configurations, the destacking apparatus also includes first and second liquid conduits for delivering cooling fluid to the first and second electrically conductive terminals, respectively. A fluid conduit may also be provided to deliver cooling air/liquid to the electromagnet, if used instead of a permanent magnet. The air/liquid/electrical conduit may also be used to actuate the retractor mechanism to avoid collision between the destacking unit and the blank as it is separated from the stack. As another option, an elevator mechanism is incorporated into the destacking apparatus to index or otherwise raise the stack of blanks (or conversely to lower the destacking apparatus) and thereby position the top-most blank of the stack to a predetermined position with respect to the magnet and the electrically conductive terminals. An ECU may be provided to automatically synchronize the indexing of the stack of blanks.

Other aspects of the present disclosure are directed to automated systems for handling electrically conductive non-ferrous metal objects. According to one example, an automated robotic system is disclosed that includes a material handling robot with an end effector for lifting and moving the top-most non-ferrous object from a stack of the objects. The system also includes a platform upon which is seated the stack of objects, an electromagnetic destacking apparatus, and a system controller that is communicatively coupled to the material handling robot and electromagnetic destacking apparatus. The destacking apparatus includes one or more magnets positioned adjacent the stack of objects. The magnet(s) generate a magnetic field in a first transverse direction with respect to a conductive surface of the non-ferrous metal object positioned on top of the stack. Two or more electrically conductive terminals are selectively movable into contact with the conductive surface of the non-ferrous object. These electrically conductive terminals pass an electrical current from a power source through the non-ferrous blank in a second transverse direction that is generally normal to the first transverse direction. In so doing, a magnetic separation force sufficient to displace the non-ferrous metal object from the stack of objects is generated in a vertical direction.

In yet other aspects of this disclosure, methods for making and methods for using any of the disclosed destacking devices are presented. By way of example, a method is presented for separating an electrically conductive non-ferrous blank from a stack of the blanks. The method includes, in any combination and in any order: positioning a magnet adjacent a lateral side of the stack of the blanks; generating, via the magnet, a magnetic field in a first transverse direction with respect to a surface of the non-ferrous blank positioned on top of the stack; contacting first and second electrically conductive terminals with the surface of the non-ferrous blank; and transmitting an electrical current in a second transverse direction along the surface of the non-ferrous blank, wherein the second transverse direction is normal to the first transverse direction such that a magnetic separation force sufficient to raise the non-ferrous blank from the stack of blanks is generated in a vertical direction.

The method may include additional or alternative steps. As a non-limiting example, the method may further comprise regulating, via an electronic control unit operatively coupled to the first and second electrically conductive terminals, the transmission of electrical current through the non-ferrous blank. As another non-limiting option, the method may also include, subsequent to the transmitting of the electrical current that functions to raise the non-ferrous blank, selectively repositioning the terminals relative to the stack of blanks via an automated travel mechanism. The method may also include retaining the displaced non-ferrous blank in a raised position such that the blank remains displaced from the stack of blanks. After the transmitting the electrical current, the electrically conductive terminals may be pivoted away from the stack.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
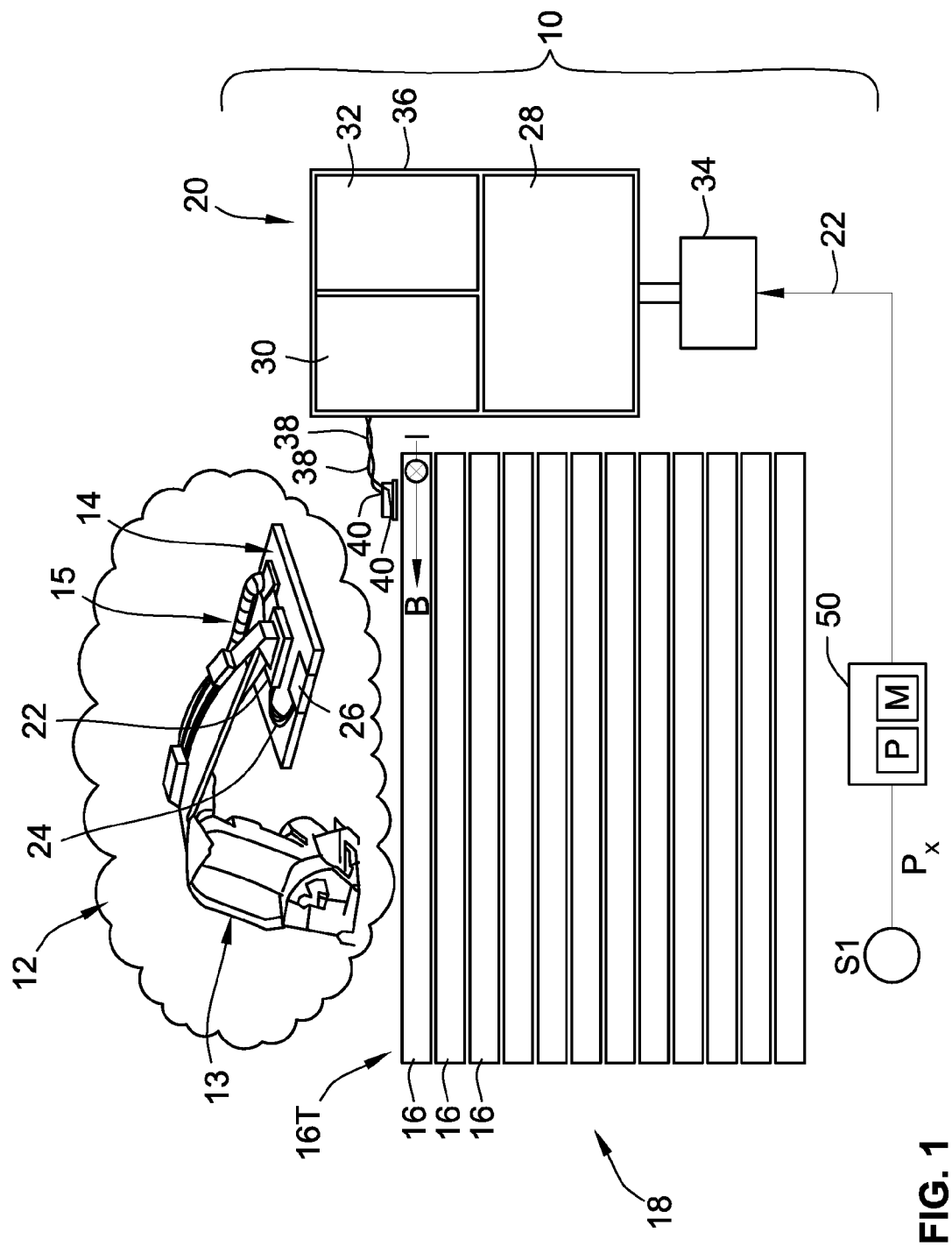
FIG. 1 is a partially schematic perspective-view illustration of a representative automated manufacturing system with a material handling robot and an electromagnetic destacking apparatus for a stack of non-ferrous blanks in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the Drawings. Rather, the disclosure is to cover all modifications, equivalents, permutations, combinations, sub-combinations, and alternatives falling within the spirit and scope of the disclosure as defined by the appended claims.

DESCRIPTION OF THE ILLUSTRATED EXAMPLES

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Aspects of the present disclosure are directed to a manufacturing process, an apparatus, a method for controlling the apparatus, an automated processing system, and a procedure for operating the system, some or all of which help to maximize manufacturing throughput for non-ferrous objects with electrically conductive surfaces. In an example, a manufacturing process is disclosed for a sheet metal handling or stamping plant. A destacker station uses electromagnetic means to separate sheet-metal blanks for feeding the separated blank into the next stage after destacking. This destacking apparatus is composed of a single or a plurality of permanent magnets or electro-magnets of predetermined polarity/polarities placed in predetermined positions with respect to the stack of non-ferrous material. Control and power means are provided for conductively or inductively injecting electric current in predetermined direction(s) into the sheet to be separated from the rest.

Also disclosed is a fanning apparatus composed of plural electrically conductive terminals that may be selectively placed in electrical contact with a conductive surface on a non-ferrous sheet at predetermined locations with respect to a permanent magnet(s) or electromagnet(s). The apparatus optionally includes or is otherwise operatively coupled to means for supplying a predetermined amount of DC current(s) in predetermined direction(s) through the conductive surface of the sheet via the conductive terminals. The aforesaid means may consist of a programmable high current AC-to-DC power supply, such as a welding power supply, or an AC-DC power supply and an ultra-capacitor with a series high current switch.

The electrically conductive terminals may have a single or plural elements that slide within a fixed member, where the slidable/movable element(s) may be electrically connected to the fixed member with an insulated, flexible electrically conductive leaf spring or similar element. The terminals may have fluid coupling provisions for fluid coolant lines that transmit fluid for removing heat generated during operation. As another option, the terminal may have provisions for removable tips to facilitate periodic replacement to maintain proper electrical contact with the conductive surface of the sheet.

Any of the disclosed a fanning device configuration may be provided with means for positioning of the magnet(s) and/or electrical terminal assembly to maintain predetermined locations of the magnet poles and electrical terminals with respect to the top of the stack of non-ferrous sheets. Additionally or alternatively, a fanning device may comprise means for indexing some or all of the stack of non-ferrous sheets to bring the top of the stack to a predetermined position with respect to the magnet and the electrical terminal assembly. An electronic controller for the fanning apparatus may be programmable to synchronize the positioning of the electrical terminals on the conductive surface of the top sheet, enabling the DC current supply to pass current therethrough of predetermined shape and duration. The electronic controller may regulate removal of the electrical terminals off of the top sheet and out of way for the sheet to be lifted off without any obstruction.

Any of the disclosed automated handling systems may include a destacking robot with an end effector having suction cups to lift the upper sheet within a predetermined time of applying current through the conductive surface of the upper sheet of the stack. A control method of the system may include moving the electrical terminal assembly out of position from the top of the stack as soon as the suction cups on the end effector of the destacking robot capture the separated top sheet of the stack.

It is contemplated that one or more of the disclosed fanning apparatuses be configured for destacking both ferrous and non-ferrous materials, wherein the magnet assembly is sized for destacking both types of materials of predetermined sizes and shapes. In this configuration, a detachable or permanently attached electrical terminal assembly may be used when non-ferrous materials are being processed in conjunction with existing air-knives for redundancy.

Some of the disclosed fanning apparatus configurations employ multiple magnets with a single polarity of magnetization facing the conductive blanks, while a current is applied in a predetermined direction to an upper blank for separation thereof. Also disclosed are configurations employing plural magnets with alternating polarities of magnetization facing the conductive blanks, while multiple electric currents are injected in opposing directions from a point on the top blank between adjacent poles to points outside the adjacent poles to create the force of separation.

In configurations where an electrically conductive electrode is actively pressed against a blank, the applied force of the electrode on the blank is oftentimes a key process variable and, thus, may be tightly controlled by design of the fixture. By design, the electrode may float upwards with a rising blank, while dynamically maintaining applied tip force on the blank. Arcing due to momentary loss of tip force is typically not desirable and, thus, should generally be prevented from occurring. Electrode details may be electrically isolated to ensure that all applied current passes through the blank.

Referring now to the drawings, wherein like reference numbers refer to like features throughout the several views, there is shown in FIG. 1 a schematic illustration of a representative automated manufacturing system, designated generally at 10, in accordance with aspects of the present disclosure. The exemplary system 10 of FIG. 1 is described herein as part of an industrial automotive stamping facility for shaping and/or cutting stacks 18 of non-ferrous electrically conductive aluminum blanks 16 into automobile panels. However, the incorporation of the illustrated system 10 into an automotive stamping facility is merely an exemplary application with which the novel aspects of this disclosure may be practiced. In the same vein, the implementation of the present concepts for stamping aluminum blanks should also be appreciated as exemplary applications of the novel concepts disclosed herein. As such, it should be understood that the aspects and features of the present disclosure may be integrated into other automated material handling facilities and utilized for other processing operations for any logically relevant type of non-ferrous object.

In the example illustrated in FIG. 1, the automated system 10 employs a material handling robot 12 that operates in concert with an electromagnetic destacking apparatus 20 for separating, lifting and moving (singly or collectively referred to interchangeably as "handling") blanks 16 from the stack 18. As indicated above, the automated system 10 may be used as part of a stamping operation in a manufacturing press using non-ferrous conductive blanks 18, i.e., flat panels or sheets of an electrically-conductive, non-magnetic material, such as aluminum, zinc, magnesium, bauxite, copper, chromite, alloys thereof, or laminated plastic and/or composite materials having a non-ferrous conductive layer or component. The embodiment of FIGS. 1 and 2, both of which may be controlled via any of the disclosed methods or processes, are intended to help eliminate air knives for separating non-ferrous blanks using compressed air.

As noted generally above, a stamping press operation typically involves a material handling robot 12, only portions of which are shown in FIG. 1 via schematic inset view, for loading the blanks 16 into the press. Such a robot 12 includes a robotic arm 13 with an end-effector 14 movably mounted to at a distal end thereof. In the particular configuration shown, the end-effector 14 may be supplied with a vacuum via a hose 15 such that the end-effector 14 may apply a suction force and thereby securely grasp and lift an uppermost blank 16T from the stack 18 of identically configured blanks 16. The uppermost blank 16T, once lifted by the robotic end-effector 14, is then loaded into a stamping press (not shown), with the robot arm 13 pivoting back and forth between the stamping press and the stack 18 until all of the blanks 16 have been sequentially fed into the press. The end-effector 14 may include a DC voltage source 22, e.g., a low-voltage auxiliary battery, a pair of electrical conductors 24, and a pair of electrical contacts 26, i.e., conductive pads or contact surfaces, with such structural elements used in a particular manner with the configuration illustrated in FIG. 2.

As part of the electromagnetic destacking apparatus 20 of FIG. 1, one or more magnets 28 are positioned adjacent one of the lateral sides of the stack 18. The magnet(s) 28 may comprise permanent magnets or electromagnets, or combinations thereof, depending on the intended application. An electrical terminal assembly, shown schematically at 30, pass electrical current into and through the top-most blank 16T in the stack 18. This operation generates a magnetic force (F) that is equal to the vector product of an electrical current (I) and magnetic field (B) times the length (L) of a given conductor, in this instance the distance between the electrical contacts on the uppermost blank 16T, i.e., $F = B \times I \times L$. This principle is harnessed in a particular manner to produce a "blank fanning" effect in which the magnetic force (F) is produced in a controlled and targeted manner to separate the blanks 16 (or at least the top few blanks 16 on the stack 18). The embodiments of FIGS. 1 and 2 use this principle—known as the Lorentz force—to produce the desired blank fanning effect, with FIG. 1 depicting use of a DC voltage source 32 to directly inject the electrical current (I) into the uppermost blank 16T.

In the illustrated example, current (I) is directly injected as a DC current into the uppermost blank 16T in the presence of a properly-oriented magnetic field generated by magnet(s) 28 in a first (transverse) direction (shown as right-to-left in FIG. 1 across the crosswise length of the blank 16T). A travelling actuator device 34 of FIG. 1 may be used to maintain the relative positioning of the magnet(s) 28 and electrical terminal assembly 30 with the stack 18. The static flux of one or more of the magnets 28 may be created using an array of permanent magnets or electromagnets in different embodiments. A supporting structure 36 maintains a relative position of the magnets 28 and electrical terminal assembly 30 with the stack 18. Supporting structure 36 may be in the nature of a stand, rack or fixture of non-conductive and/or non-magnetic material that is positioned alongside the stack 18.

With continuing reference to FIG. 1, the DC voltage source 32 has an electric potential V(t) transmitted through a pair of electrical conductors 38 each terminating at a respective electrical contact 40 pressed against or otherwise seated on the upper surface of the top-most blank 16T. Contacts 40 are electrically connected to the DC voltage source 32 via their corresponding electrical conductors 38. An electronic control unit (ECU) 50, which may be in the nature of a weld controller or other suitable electronic controller, is operable for injecting electrical current (I) into the uppermost non-ferrous blank 16T in a second (transverse) direction (shown as in-and-out of the page in FIG. 1 across the crosswise width of the blank 16T). The direction of the electric current (I) is portrayed as being perpendicular with respect to the direction of the magnetic field (B) as shown along the conductive top surface of blank 16T. This may occur whenever the electrical contacts 40 directly contact the surface of the uppermost blank 16T and the circuit is closed with the DC voltage source 32, thereby delivering the electrical current (I) at the voltage of the DC voltage source 32.

As part of an example stamping operation, an optional position sensor S1 may be used to detect a position of the end-effector 14 with respect to the uppermost sheet 16T, with the detected position (arrow $P_x$) transmitted to the ECU 50. Sensor S1 may be any suitable position sensor, such as but not limited to a Hall Effect sensor or rotary encoder. The controller 50, e.g., one or more computer devices having sufficient memory (M), a processor (P), and instructions embodying the necessary programming thereof, may be in communication with the material handling robot 12, e.g., with a separate robot controller, and programmed to receive the position signal $P_x$. The controller 50 may then transmit control signals 22 to the electromagnetic destacking apparatus 20 to cause production of the electrical current (I) only when the position $P_x$ indicates that the end-effector 14 is within a calibrated distance of the upmost blank 16T. In this way, positioning and speed control of the electrical terminal assembly 30 with respect to the stack 16 may be closely coordinated with the overall motion of the material handling robot 12, e.g., via closed-loop or open-loop feedback control. Likewise, the control signals 22 may position the electrical terminal assembly 30 and magnet(s) 28 with respect to the stack 18, such as by gradually lowering the apparatus 20 as blanks 16 are sequentially consumed by the stamping process and the height of the stack 18 decreases.

Figure 2:
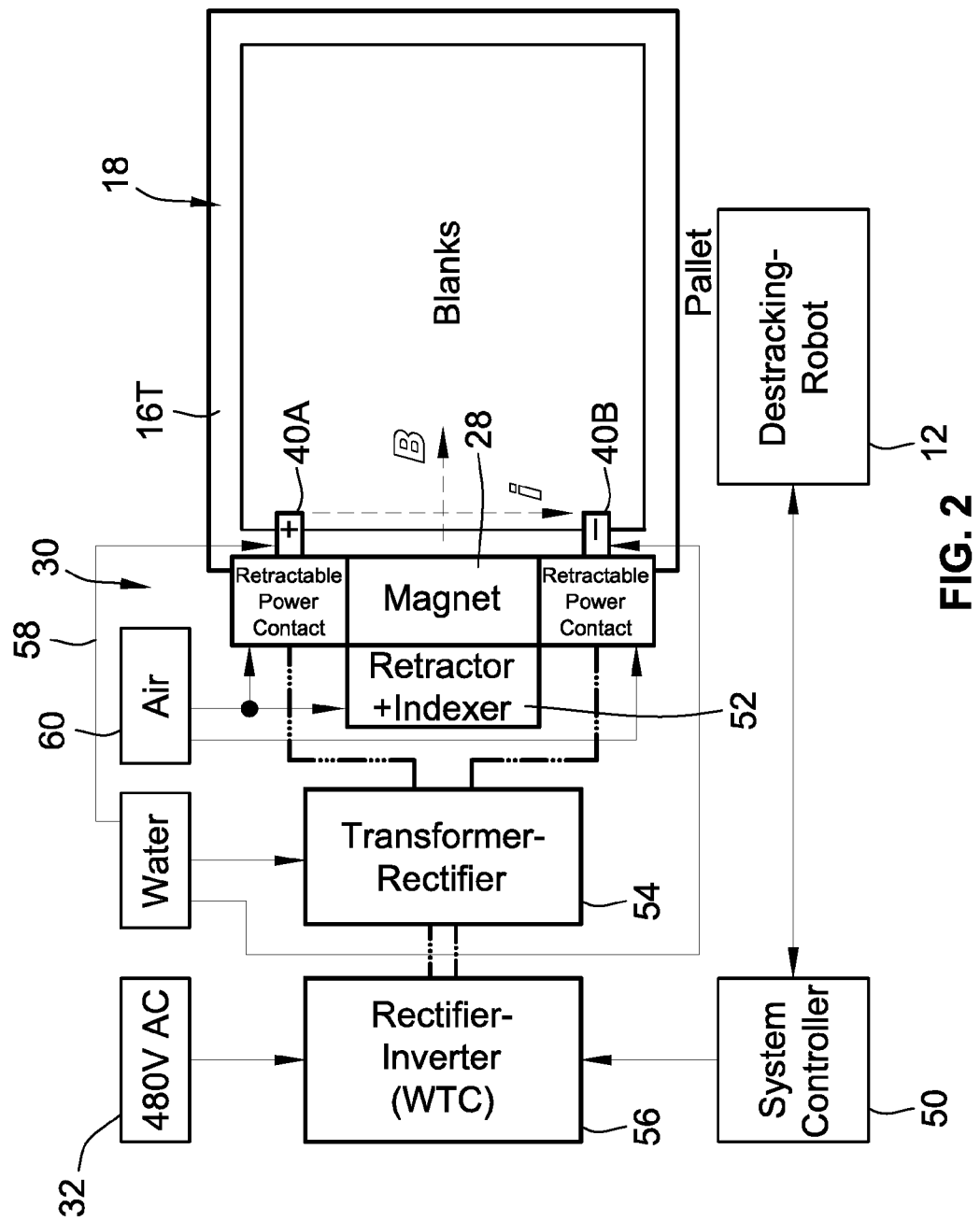
FIG. 2 is a schematic diagram of the representative electromagnetic destacking apparatus of FIG. 1.

Turning next to FIG. 2, there is shown a more detailed schematic diagram of the representative electromagnetic destacking apparatus 20 of FIG. 1. In this illustration, first and second electrically conductive terminals 40A and 40B, respectively, are spring loaded so that, as the topmost non-ferrous metal blank 16T fans upwardly, lifts off or otherwise displaces from the stack 18, the terminal contacts retract with minimal impact on blank motion. When the top blank 16T is then moved by the material handling robot 12, the electrical terminal assembly 30 is rotated, swung, or otherwise repositioned, e.g., via a retractor and indexer mechanism 52 away from the stack 18 so the top blank 16T can clear the destacking apparatus 20. This may be done with an electronically controlled actuator using compressed air, hydraulic fluid, or an electrically driven motor, as some non-limiting examples. In the illustrated configuration, the magnet 28 of FIG. 2 is a high-energy-product rare earth type magnet, such as a neodymium-iron-boron permanent magnet. The retractor and indexer mechanism 52 may be composed of a rotary actuator that is configured to rotate the entire electrical terminal assembly 30, or just the contacts 40A, 40B, out of the way of the robot's 12 arm 14 and the blank 16T.

Also shown in FIG. 2 is a transformer-rectifier 54 that receives high voltage, low current power from a power source 32, and steps it down to low voltage and high current prior to transmission to the electrical terminal assembly 30. In the illustrated example, the transformer-rectifier 54 is fabricated with one or more standard welding transformers. Transformer-rectifier 54 also functions to convert the high current, low voltage alternating current (AC) to high current, low voltage direct current (DC). A rectifier-inverter device 56 may use existing welding transformers and controllers to provide low voltage, high DC current for powering the destacking apparatus 20. In this example architecture, fluid hosing 58 provides cooling liquid (e.g., water, oil, etc.) to the contacts and/or pressurized air, e.g., from pressurized air source 60, to the destacking apparatus retractor mechanism.

Figure 3A:
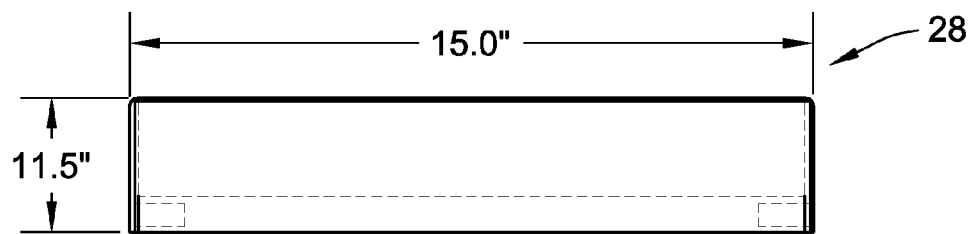
FIGS. 3A and 3B are plan-view and side-view schematic illustrations, respectively, of a magnet used by the representative electromagnetic destacking apparatus of FIG. 1 for separating non-ferrous blanks.
Figure 3B:
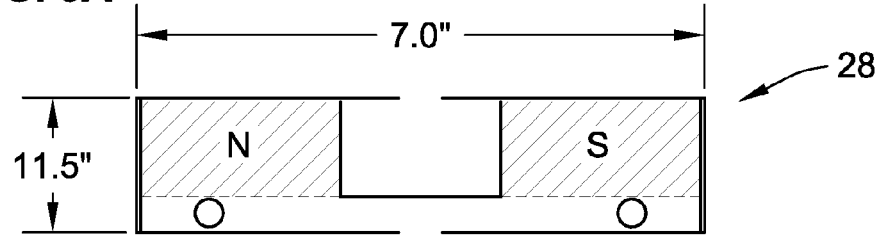

FIGS. 3A and 3B illustrate the geometry and dimensions of a representative magnet 28 that may be used by the electromagnetic destacking apparatus 20 of FIGS. 1 and 2. FIG. 3A shows the magnet 28 with a rectangular plan-view profile and a length of approximately 15.0 inches. FIG. 3B shows the magnet 28 with a rectangular side-view profile, a height of approximately 7.0 inches and a depth of about 11.5 inches. Also shown in FIG. 3B are the relative positions and the rectangular shapes of the north and south poles N and S, respectively, of the magnet 28.

Figure 4:
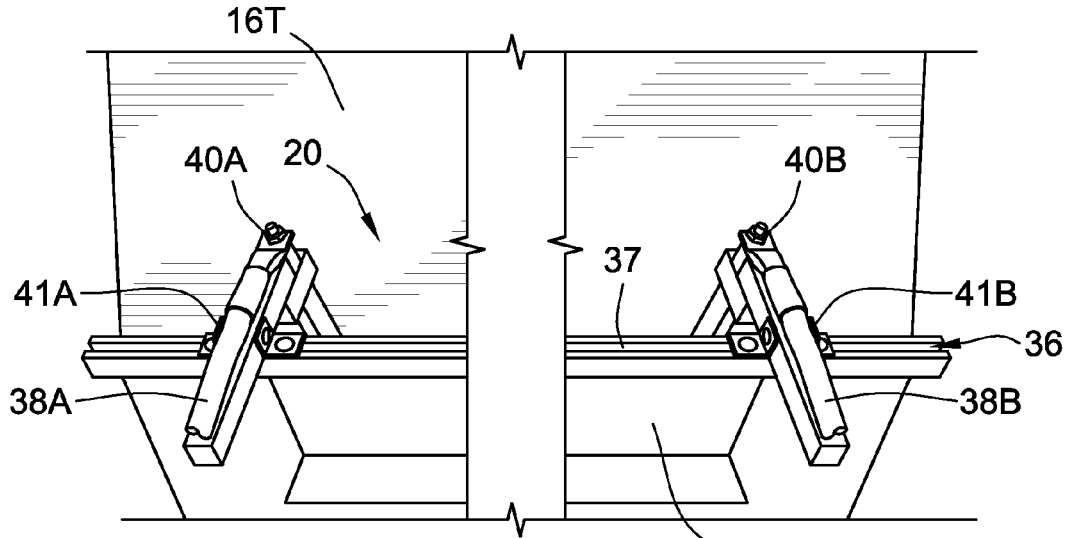
FIG. 4 is a perspective view of an example of an electromagnetic destacking apparatus with a single magnet and a movable electrode support in accordance with aspects of the present disclosure.
Figure 5:
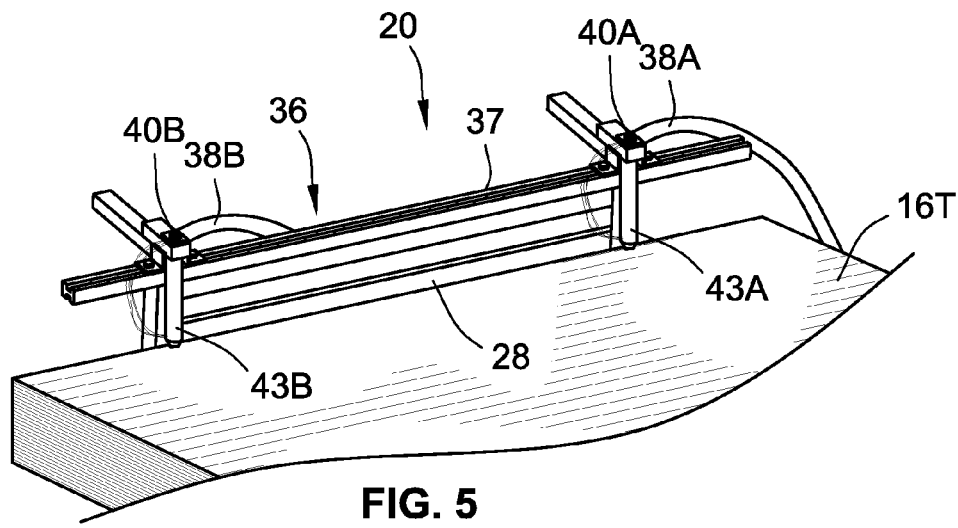
FIG. 5 is an alternative perspective view of the representative electromagnetic destacking apparatus of FIG. 4.
Figure 6:
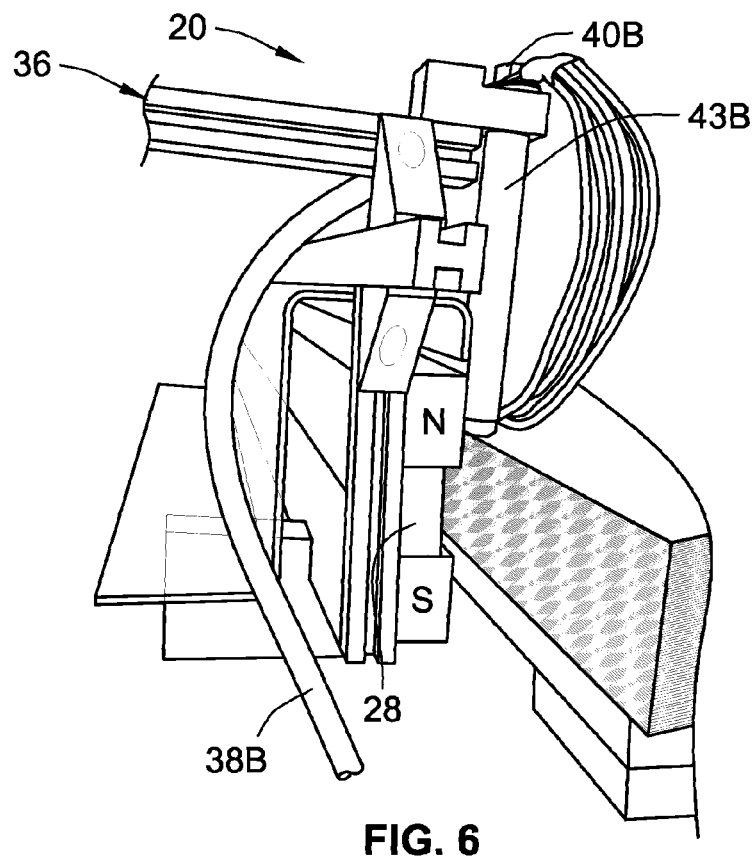
FIG. 6 is another alternative perspective view of the representative electromagnetic destacking apparatus of FIG. 4.

Shown in FIG. 4 is a perspective view of an example of an electromagnetic destacking apparatus 20 with a single magnet 28 and a movable electrode support structure 36. In this example, the electrical contacts 40A, 40B and electrical conductors 38A, 38B are slidable on a transverse support rail 37 via respective slidable mounting brackets 41A and 41B. Mounting brackets 41A, 41B also allow for the rotational pivoting of the electrical contacts 40A, 40B. FIG. 5 is an alternative perspective view of the representative electromagnetic destacking apparatus 20 of FIG. 4. In this example, the electrical contacts 40A and 40B are repositionable fore and aft on their respective slidable mounting brackets 41A, 41B. FIG. 6 is a side perspective-view of the representative electromagnetic destacking apparatus 20 of FIG. 4. In this example, the electrical contacts 40A and 40B are vertically repositionable via respective slidable mounting rails 43A and 43B.

Figure 7B:
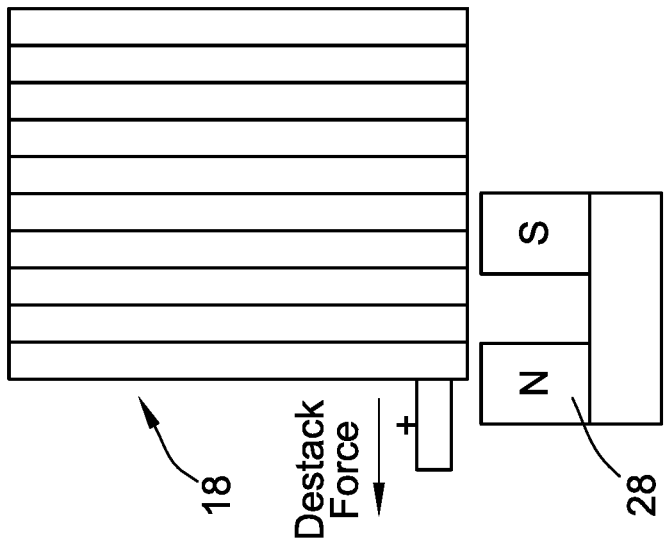
FIGS. 7A and 7B are plan-view and side-view schematic illustrations, respectively, of a representative destacking magnet and electrode arrangement with respect to a stack of non-ferrous metal blanks in accordance with aspects of the present disclosure.
Figure 7A:
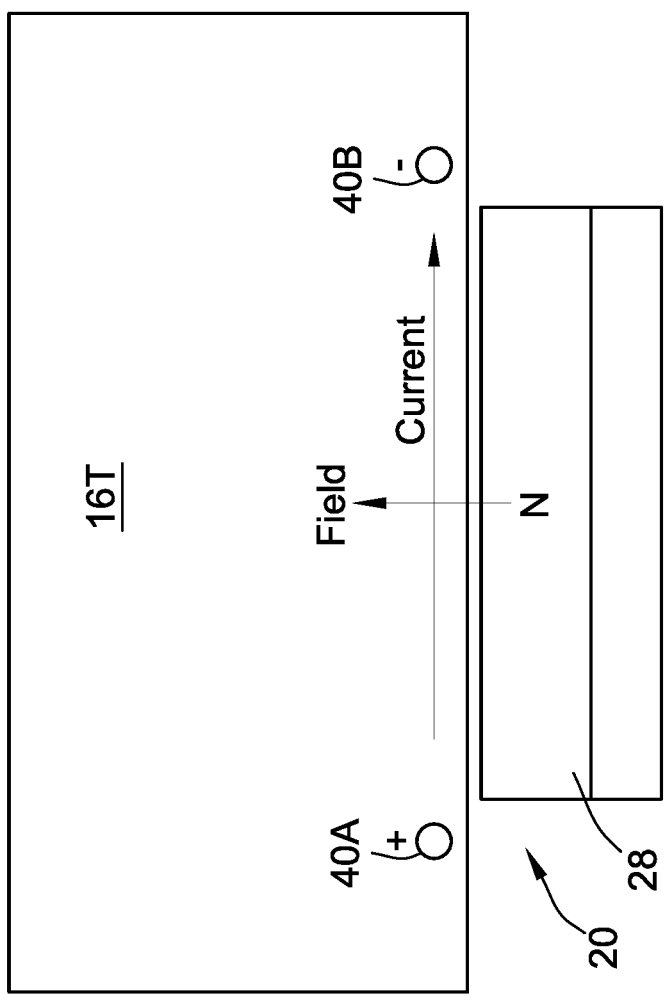

FIGS. 7A and 7B schematically illustrate a representative destacking magnet and electrode arrangement with respect to a stack 18 of non-ferrous metal blanks 16 to achieve separation of the top blank 16T. With the positive and negative contact electrodes 40A and 40B arranged in this manner with respect to the magnet 28, only the top (north) pole of the magnet 28 is used to produce a destacking lift force on the top blank 16T. Alternatively, the opposite (south) pole of the magnet 28 can be used, for example, with the direction of the electric current reversed. A height of magnet (see, e.g., FIG. 3B) can be selectively varied to provide a desired lifting/fanning distance.

Figure 8:
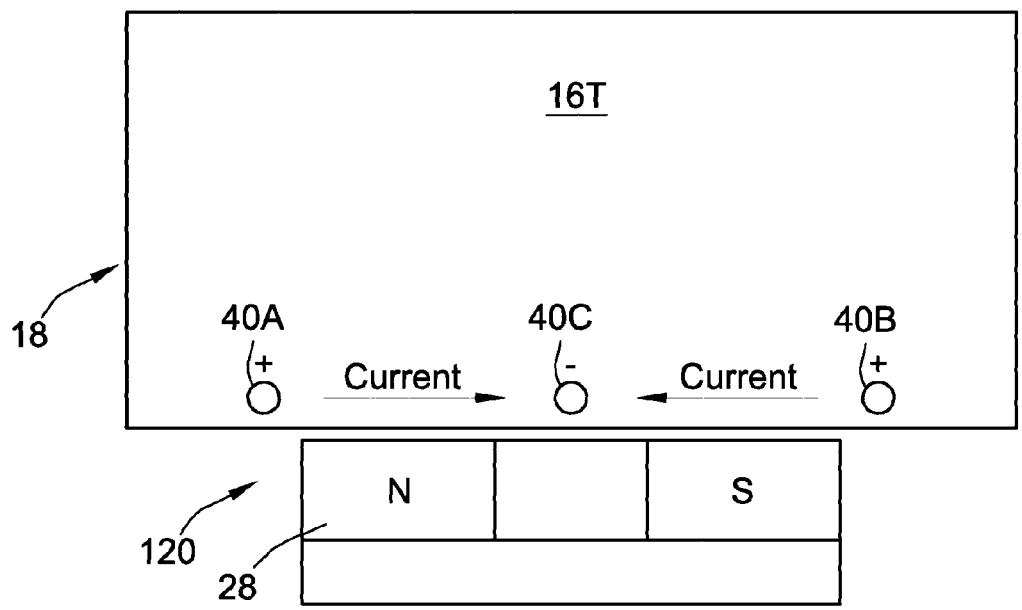
FIG. 8 is a plan-view schematic illustration of another representative destacking magnet and electrode arrangement with respect to a stack of non-ferrous metal blanks in accordance with aspects of the present disclosure.

FIG. 8 is a schematic illustration of another representative electromagnetic destacking apparatus 120 with a destacking magnet and electrode arrangement with respect to a stack 18 of non-ferrous metal blanks 16 to achieve a desired separation force on a top blank 16T. According to this exemplary arrangement, three electrodes 40A, 40B and 40C are employed with both north and south poles N and S of the magnet 28 used to produce a lifting force on the top sheet 16T. A height of the magnet 28 can be the same as a height of the stack 18 or, if desired, smaller if indexing of the stack is used.

Optionally, any of the disclosed destacking apparatuses may employ two contact electrodes in cooperation with a three-pole magnet—two lateral end (south) poles and a center (north) pole. The center (north) pole of the magnet may be used to produce a lifting force on the top sheet 16T. For this configuration, a height of the magnet can be the same as the height of the stack 18 or, if so desired, smaller if indexing is used. Any of the disclosed destacking apparatuses may include a segmented-bar magnet supported on a back-iron base. Surface protection can be provided in addition to optional non-magnetic spacers. In this instance, the magnet's north and south poles may be positioned to face upwardly. Optionally, the representative destacking apparatuses may employ a destacking single-bar magnet with a subjacent back iron, non-magnetic spacer and surface protection.

For at least some embodiments, a destacking bar magnet may include a back-iron support for use in a destacking apparatus. These destacking apparatuses may utilize a single destacking magnet (or a series of magnet segments stacked tightly together) fabricated with a transversely oriented non-magnetic spacer and surface protection. In this embodiment, the bar magnet may have a length of approximately 100 cm, a width of approximately 10 cm, and a height of approximately 5 cm. A surface protecting magnet cover may have a thickness of approximately 0.5 mm to approximately 2.0 mm. The back-iron support may have a thickness of approximately 3.0 cm. Optional magnet characteristics include magnet Br that is greater than approximately 1.2 T, magnet energy that is greater than approximately 50 MGOe, and an operating ambient temperature of approximately 50° C.

For at least some embodiments, a destacking bar magnet assembly may be employed with a back-iron support, optional spacer, and surface protecting cover. The configuration may help to achieve a fairly uniform vertical flux density $B_y$ of greater than approximately 0.2 T at a vertical distance of approximately y=1 cm over a minimum transverse distance of approximately x=2 cm along each of the poles. Magnet and back-iron support design may be modified to achieve a desired flux density. Optional embodiments may employ a destacking bar magnet with back-iron support for use in a representative destacking apparatus, wherein the destacking apparatus also utilizes a single destacking magnet (or a series of magnet segments stacked tightly together) fabricated with a transversely oriented aluminum or other equivalent non-magnetic spacer and non-magnetic surface protecting coating. The bar magnet may have a length of approximately 100 cm, a width of approximately 5 cm, and a height of approximately 3 cm. The surface protecting coating may have a thickness of approximately 0.5 mm to approximately 2.0 mm. The back-iron support may have has a thickness of approximately 3.0 cm. Aluminum spacer has a width W of approximately 5.0 cm and a depth D of approximately 3.0 cm. Magnet characteristics for the embodiment of FIG. 15 include magnet Br that is greater than approximately 1.4 T for a magnet type N52 operating at an ambient temperature of approximately 50° C. These representative dimensions would change if a different magnet material is used.

For at least some embodiments, disclosed destacking apparatus configurations help to achieve a fairly uniform vertical flux density $B_y$ of greater than approximately 0.2 T at a vertical distance of approximately y=1.0 cm over a minimum transverse distance of approximately x=2.0 cm along each of the poles. Magnet and back-iron support design can be modified to achieve a desired flux density. A spacer or spacers can be eliminated while still maintaining these performance characteristics. For any or all of the configurations discussed herein, the back-iron support can be eliminated, for example, if a Halbach arrangement of permanent magnets is used instead of the illustrated magnet arrangement. In the same vein, the permanent bar magnets illustrated in the drawings can be replaced with one or more electromagnets, for example, to provide additional controllability of the magnetic field.

Vertical destacking forces generated by a magnet on a representative non-ferrous metal blank may be varied based on gap size between the magnet and blank. Disclosed magnets may have a height of at least approximately 3.0 cm. For at least some configurations, a magnet may have a height of at least approximately 4.0 or at least approximately 5.0 cm. Also disclosed are representative alternating-current (AC) electrodynamic destacking apparatuses without a magnet. In this example, frequency can depend on sheet thickness and electrical conductivity, e.g., about 1 to about 5 kHz. Disclosed electromagnetic destacking apparatuses may employ a magnet without a back iron and located above a top blank rather than adjacent to it as in the previous embodiments. In this example, DC electric current, pulsating DC, or unidirectional pulse current is employed. The magnet can be encased with non-magnetic material for pinch protection. Also disclosed are direct-current (DC) electromagnetic destacking apparatuses with DC, pulsating DC, or unidirectional pulse operating capabilities having permanent magnet(s) with flux directing iron poles located immediately above the top blank. The current injected into top blank can be DC, pulsating DC, or unidirectional pulse operating in accordance with aspects of the present disclosure.

Also disclosed are destacking magnet arrangements for non-ferrous metal blanks with angled corners. In a first optional arrangement, a vertical magnet field is produced with four magnets stacked vertically, with each pair of magnets connected via back iron piece. In a second optional arrangement, a horizontal filed is produced with two magnets connected via an angled back iron piece. Both configurations may require current injection at three point by a minimum of three electrodes. Also disclosed are electromagnetic destacking apparatuses using conductively injected current in the bottom sheet of two stuck together sheets reacting against a magnetic field set-up by an array of electromagnets or permanent magnets. A stationary permanent magnet produces a magnetic field that reacts against two adjacent blanks resulting in separation of the lower one as the upper one is held, for example, by suction cups in the end effector. The magnitude of the separation force depends, for example, on field strength of the permanent magnet, current injected into the lower sheet, spacing between the contact electrodes, and the gap between the edge of the sheet and the magnet surface.

There is also disclosed electromagnetic destacking apparatuses using conductively injected time varying source current in the bottom sheet and induced eddy currents in the top sheet to separate two sheets that are stuck together during the destacking operation in accordance with aspects of the present disclosure. For any of the logically relevant examples disclosed herein, the iron cores/poles can be eliminated if a Halbach arrangement of permanent magnets is used. Likewise, one or more permanent magnets can be replaced with one or more electromagnets.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present disclosure expressly includes any and all combinations and subcombinations of the preceding elements and related aspects.

What is claimed:

1. A destacking apparatus for separating an electrically conductive non-ferrous blank from a stack of electrically conductive non-ferrous blanks, the destacking apparatus comprising:
   a magnet configured to position adjacent the stack of blanks, the magnet being configured to generate a magnetic field in a first direction with respect to a surface of the non-ferrous blank positioned on top of the stack of blanks;
   first and second electrically conductive terminals configured to contact the surface of the non-ferrous blank and pass an electrical current through the non-ferrous blank in a second direction, wherein the second direction of the electrical current is generally normal to the first direction of the magnetic field such that a magnetic separation force sufficient to displace at least a portion of the non-ferrous blank from the stack of blanks is generated in a third direction; and
   first and second liquid conduits configured to deliver cooling liquid to the first and second electrically conductive terminals, respectively.

2. The destacking apparatus of claim 1, wherein the magnet includes a plurality of magnets.

3. The destacking apparatus of claim 1, wherein the magnet includes an electromagnet or a permanent magnet, or both.

4. The destacking apparatus of claim 1, further comprising an electronic control unit operatively coupled to the first and second electrically conductive terminals and configured to regulate the transmission of electrical current through the non-ferrous blank.

5. The destacking apparatus of claim 4, wherein the electronic control unit includes a programmable high-current AC-to-DC power supply controller or an AC-DC power supply controller with an ultra-capacitor and a series high current switch.

6. The destacking apparatus of claim 1, further comprising an automated travel mechanism configured to selectively reposition the electrically conductive terminals relative to the stack of blanks.

7. The destacking apparatus of claim 1, further comprising an isolation mechanism operable to retain the non-ferrous blank in a raised position at least partially displaced from the stack of blanks.

8. The destacking apparatus of claim 1, further comprising a destacking apparatus stand configured to position the magnet adjacent the stack of blanks and to place the first and second electrically conductive terminals in contact with the surface of the non-ferrous blank.

9. The destacking apparatus of claim 8, wherein the destacking apparatus stand includes a back-iron base configured to support thereon the magnet.

10. The destacking apparatus of claim 1, further comprising a transformer-rectifier configured to receive high voltage, low current power from a power source, step down the received power to low voltage, high current power, and deliver the stepped down power to the first and second electrically conductive terminals.

11. A destacking apparatus for separating an electrically conductive non-ferrous blank from a stack of electrically conductive non-ferrous blanks, the destacking apparatus comprising:
   a magnet configured to position adjacent the stack of blanks, the magnet being configured to generate a magnetic field in a first direction with respect to a surface of the non-ferrous blank positioned on top of the stack of blanks;
   first and second electrically conductive terminals configured to contact the surface of the non-ferrous blank and pass an electrical current through the non-ferrous blank in a second direction, wherein the second direction of the electrical current is generally normal to the first direction of the magnetic field such that a magnetic separation force sufficient to displace at least a portion of the non-ferrous blank from the stack of blanks is generated in a third direction; and
   a destacking apparatus stand with a transverse support rail, the first and second electrically conductive terminals each being slidably mounted to a respective portion of the transverse support rail.

12. A destacking apparatus for separating an electrically conductive non-ferrous blank from a stack of electrically conductive non-ferrous blanks, the destacking apparatus comprising:
   a magnet configured to position adjacent the stack of blanks, the magnet being configured to generate a magnetic field in a first direction with respect to a surface of the non-ferrous blank positioned on top of the stack of blanks;
   first and second electrically conductive terminals configured to contact the surface of the non-ferrous blank and pass an electrical current through the non-ferrous blank in a second direction, wherein the second direction of the electrical current is generally normal to the first direction of the magnetic field such that a magnetic separation force sufficient to displace at least a portion of the non-ferrous blank from the stack of blanks is generated in a third direction; and
   a destacking apparatus stand with first and second biasing mechanisms configured to bias the first and second electrically conductive terminals, respectively, into contact with the surface of the non-ferrous blank.

13. A destacking apparatus for separating an electrically conductive non-ferrous blank from a stack of electrically conductive non-ferrous blanks, the destacking apparatus comprising:
   a magnet configured to position adjacent the stack of blanks, the magnet being configured to generate a magnetic field in a first direction with respect to a surface of the non-ferrous blank positioned on top of the stack of blanks;

first and second electrically conductive terminals configured to contact the surface of the non-ferrous blank and pass an electrical current through the non-ferrous blank in a second direction, wherein the second direction of the electrical current is generally normal to the first direction of the magnetic field such that a magnetic separation force sufficient to displace at least a portion of the non-ferrous blank from the stack of blanks is generated in a third direction; and a destacking apparatus stand with first and second pivotable armatures, the first electrically conductive terminal being mounted on the first pivotable armature and the second electrically conductive terminal being mounted on the second pivotable armature.

14. The destacking apparatus of claim 13, further comprising:

first and second driving devices operable to selectively pivot the first and second pivotable armatures, respectively; and an electronic controller programmable to control the driving devices and thereby synchronize pivoting of the electrically conductive terminals into and out of contact with the surface of the non-ferrous blank.

15. An automated robotic system for handling electrically conductive non-ferrous metal objects arranged in a stack, the automated robotic system comprising:

a material handling robot with an end effector configured to remove a top one of the non-ferrous metal objects from the stack of the objects;

a system controller communicatively coupled to the material handling robot;

a platform upon which is seated the stack of objects; and a destacking apparatus mounted adjacent the stand and communicatively coupled to the system controller, the destacking apparatus including:

a fixture assembly;

one or more magnets attached to the fixture assembly and positioned adjacent the stack of the objects, the one or more magnets being configured to generate a magnetic field in a first transverse direction with respect to a conductive surface of the non-ferrous metal object positioned on top of the stack;

two or more electrically conductive terminals movably attached to the fixture assembly and selectively pivotable into contact with the conductive surface of the non-ferrous metal object, the electrically conductive terminals being configured to pass an electrical current through the non-ferrous blank in a second transverse direction, wherein the second transverse direction is generally normal to the first transverse direction such that a magnetic separation force sufficient to displace at least a portion of the non-ferrous metal object from the stack of objects is generated in a vertical direction; and first and second liquid conduits configured to deliver cooling liquid to the first and second electrically conductive terminals, respectively.

16. A method for separating an electrically conductive non-ferrous blank from a stack of electrically conductive non-ferrous blanks, the method comprising:

positioning a magnet adjacent a lateral side of the stack of blanks;

generating, via the magnet, a magnetic field in a first transverse direction with respect to a surface of the non-ferrous blank positioned on top of the stack of blanks;

contacting first and second electrically conductive terminals with the surface of the non-ferrous blank;

transmitting, via the first and second electrically conductive terminals, an electrical current in a second transverse direction through the non-ferrous blank, wherein the second transverse direction is generally normal to the first transverse direction such that a magnetic separation force sufficient to raise at least a portion of the non-ferrous blank from the stack of blanks is generated in a vertical direction; and delivering, via first and second liquid conduits, a cooling liquid to the first and second electrically conductive terminals, respectively.

17. The method of claim 16, wherein the magnet includes a plurality of magnets.

18. The method of claim 16, wherein the magnet includes an electromagnet or a permanent magnet, or both.

19. The method of claim 16, further comprising regulating, via an electronic control unit operatively coupled to the first and second electrically conductive terminals, the transmission of electrical current through the non-ferrous blank.

20. The method of claim 19, wherein the electronic control unit includes a programmable high-current AC-to-DC power supply or an AC-DC power supply with an ultra-capacitor and a series high current switch.

* * * * *